Feb. 19, 1952 — H. R. HILSTROM — 2,586,166
APPARATUS FOR PRODUCING DRIVE PINS
Filed May 1, 1946 — 6 Sheets-Sheet 1
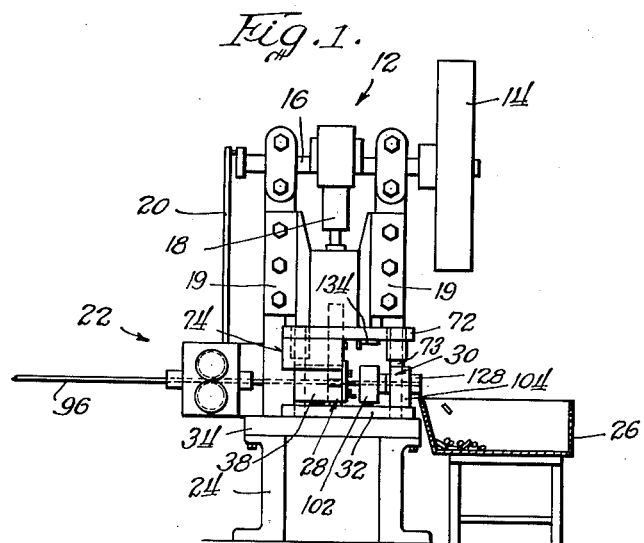
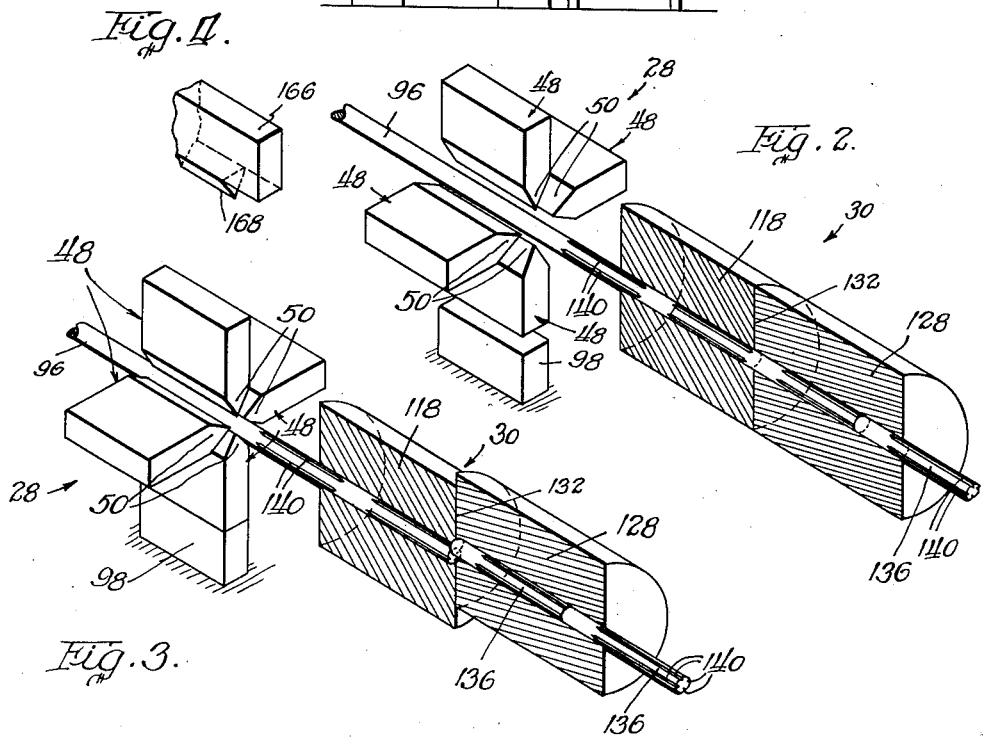
Inventor:
Hollis R. Hilstrom.
By Bair & Freeman
Attorneys.

Feb. 19, 1952     H. R. HILSTROM     2,586,166
APPARATUS FOR PRODUCING DRIVE PINS
Filed May 1, 1946     6 Sheets-Sheet 2
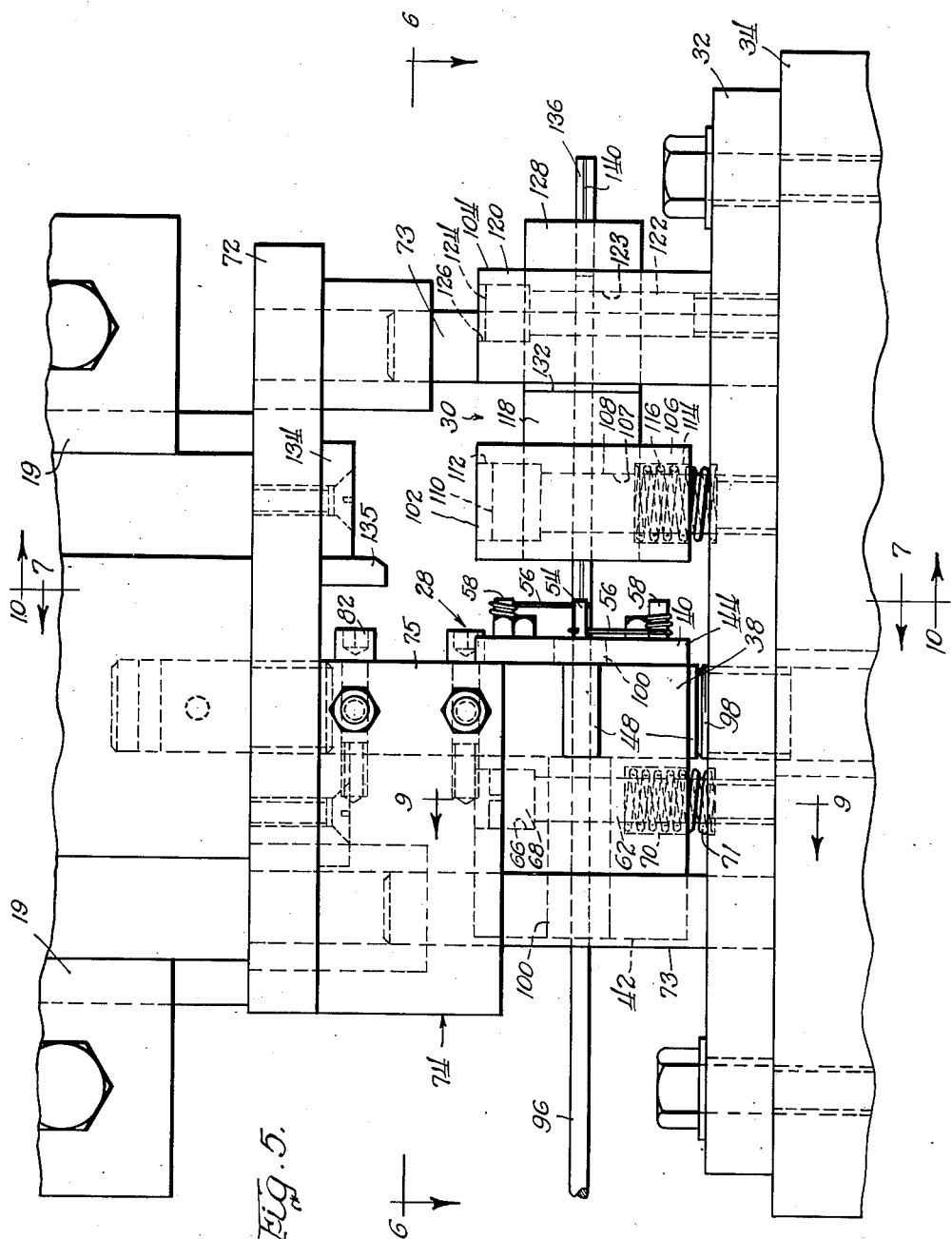
Inventor:
Hollis R. Hilstrom
By Baird & Freeman
Attorneys Feb. 19, 1952     H. R. HILSTROM     2,586,166
APPARATUS FOR PRODUCING DRIVE PINS
Filed May 1, 1946     6 Sheets-Sheet 4
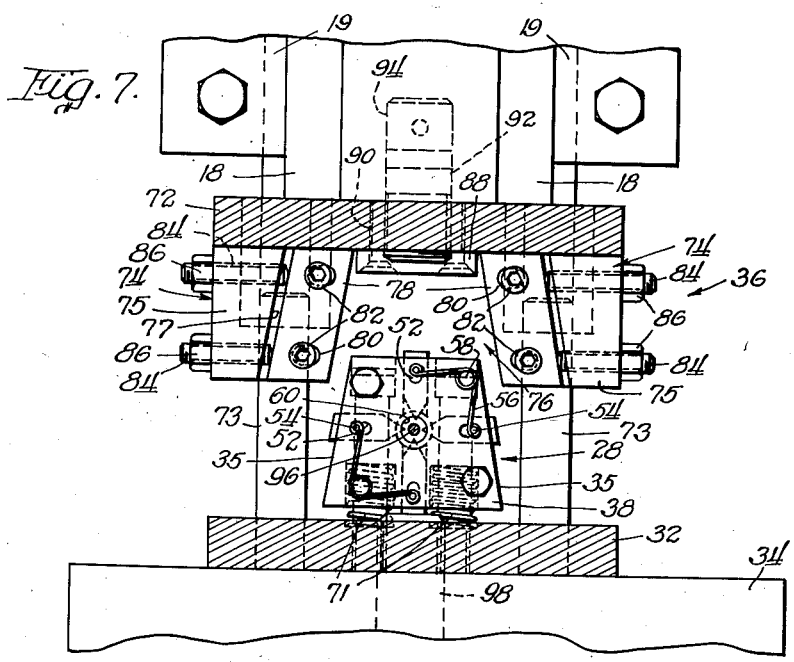
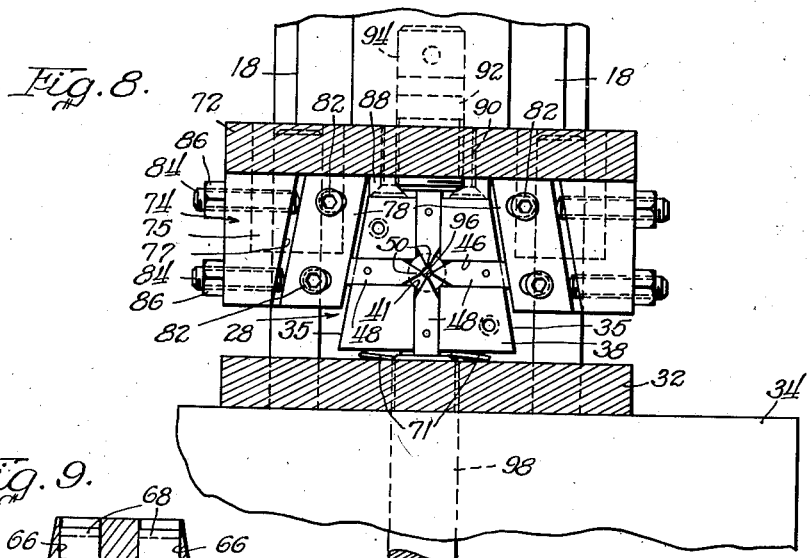
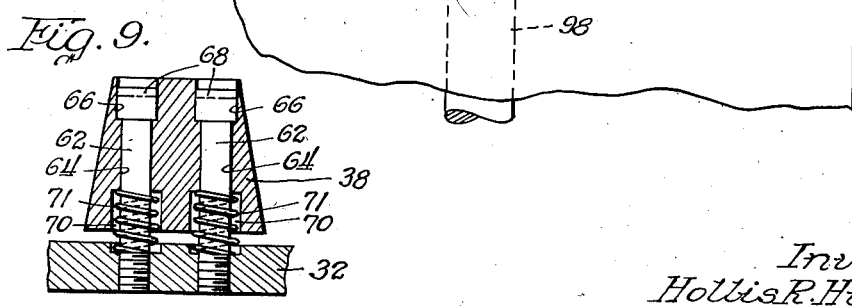
Inventor:
Hollis R. Hilstrom
By Bair & Freeman
Attorneys Inventor:
Hollis R. Hilstrom
By Bair & Freeman
Attorneys Feb. 19, 1952  H. R. HILSTROM  2,586,166
APPARATUS FOR PRODUCING DRIVE PINS
Filed May 1, 1946  6 Sheets-Sheet 6
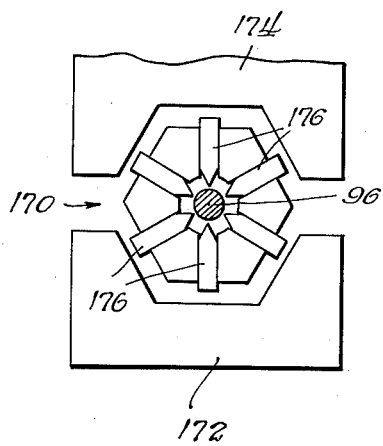
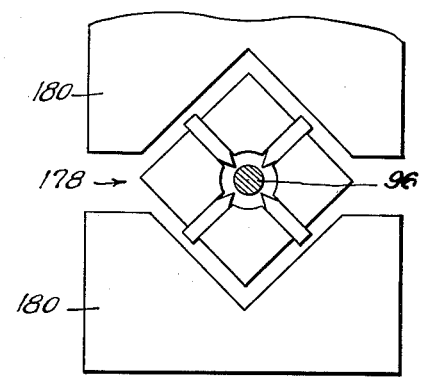
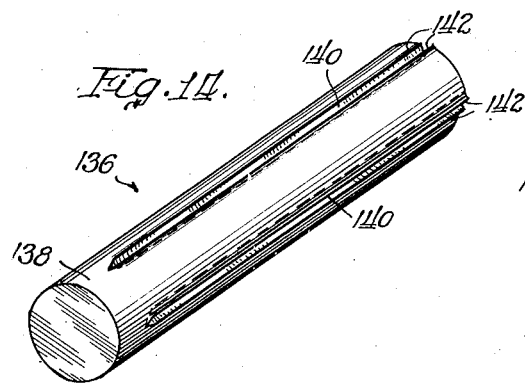
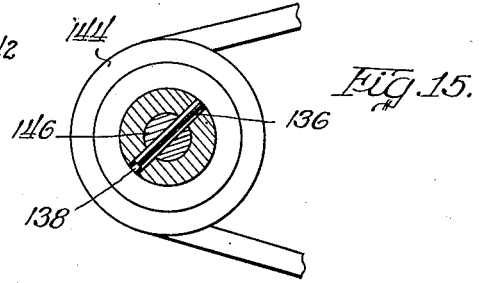
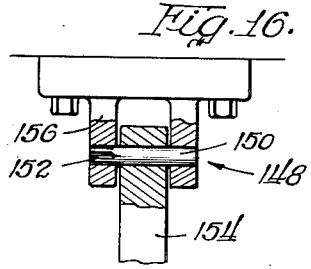
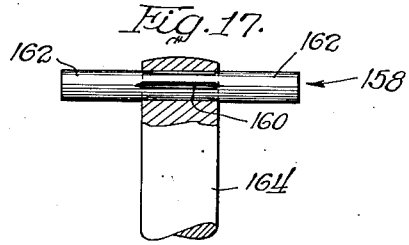
Inventor:
Hollis R. Hilstrom
By Bair & Freeman
Attorneys Patented Feb. 19, 1952

2,586,166

UNITED STATES PATENT OFFICE 2,586,166

APPARATUS FOR PRODUCING DRIVE PINS

Hollis R. Hilstrom, Western Springs, Ill.

Application May 1, 1946, Serial No. 666,342

5 Claims. (Cl. 78—20)

This invention relates to apparatus for producing drive pins.

A very common use for drive pins is in securing parts of machinery together, as, for example, a collar on a shaft, the pin being driven in registering radially disposed holes in the collar and shaft. There are also many other uses to which drive pins may be put.

Formerly such pins were made of tapered formation so that they could be easily guided and driven into the holes to tightly fitting positions.

Tapered pins are exceedingly expensive to manufacture, for in order that they fit properly they must be accurate, which necessitates grinding, an expensive procedure, as well as accurately finishing the tapered holes into which the pins are to fit.

A more recent development is a drive pin of uniform diameter which is splined or fluted. These flutes are made by forming grooves in the pin by which metal is displaced to form flutes extending outwardly from the outer normal surface of the pin. The hole into which the pin is to fit is, of course, of uniform diameter. When the pin is driven into the hole the flutes bite into the peripheral surface of the hole and thereby hold the pin in place; or if the metal in which the hole is formed is too hard, the edges of the flutes are deformed and displaced into the grooves, but in this event the friction between the flutes and the metal in which the hole is formed will be great enough to retain the pin in place.

My invention has to do with apparatus for making fluted pins as described above.

An object of my invention is the provision of means for producing such pins on a mass production basis.

Another object is the provision of means for converting a standard punch press, by a minor alteration, for making such pins.

Still another object of the invention resides in the fact that a set of dies can be used for pins of any diameter, within a wide range, it being necessary only to make an adjustment therein.

A further object is to provide for forming pins in a continuously operating procedure from round coiled stock. The stock on being drawn from the coil, is passed through a standard roll type straightener.

A still further object is to provide for forming a plurality of flutes in the pins.

Specifically, the apparatus includes a die block which can be adapted to a standard punch press. The block is provided with a plurality of tool bits disposed in radial position around a central opening through which rod stock is projected. When the press is operated, the tool bits are forced inwardly, cutting grooves and forming flutes in the rod stock, and as part of the same operation, the rod is cut off forming pins of the desired length, by presetting an automatic feed attached to the press.

The grooves and flutes are made of definite length with relation to the length of the pins. In order that a pin be driven into a tightly fitting hole the ends of the flutes must be spaced from one end of the pin to leave a certain length of the normal diameter of the pin for leading the pin into the hole.

Another reason for spacing the flutes from one end of the pins resides in the different uses to which the pins are put. The pins may be formed for providing hinge means. When used as a hinge, the pin is formed with grooves and flutes at one end by which the pin is retained in place, and the remainder of the pin affords the bearing surface for a swinging member.

Another object therefore of my invention is the provision of drive pins having flutes positioned longitudinally thereof.

Still another object is the provision of means for forming flutes on stock material in definite spaced relation and cutting the stock to form pins having the flutes thereon in definite spaced relation to the ends of the pin.

A further object is to provide pins of different lengths from stock material.

With these and other objects in view, my invention consists in the construction, arrangement and combination of the various parts of my device whereby the objects contemplated are attained as hereinafter more fully set forth, pointed out in my claims, and illustrated in the accompanying drawings, in which:

Figure 1 is a side elevational view of the apparatus;

Figure 2 is a perspective view of certain operating parts in their relative positions and detached from the machine;

Figure 3 is a view similar ot Figure 2 showing the same parts just after performing an operation;

Figure 4 is an alternate tool bit having a short cutting edge;

Figure 5 is an enlarged side view of a portion of the machine;

Figure 7 is a view taken on line 7—7 of Figure 5;

Figure 8 is similar to Figure 7 with the die closed;

Figure 9 is a sectional view taken on line 9—9 of Figure 5;

Figures 12 and 13 are modified forms of dies and cooperating die blocks.

Figure 14 is a perspective view of a finished drive pin; and

Figures 15, 16 and 17 show different uses to which the drive pins are put.

Figure 6:
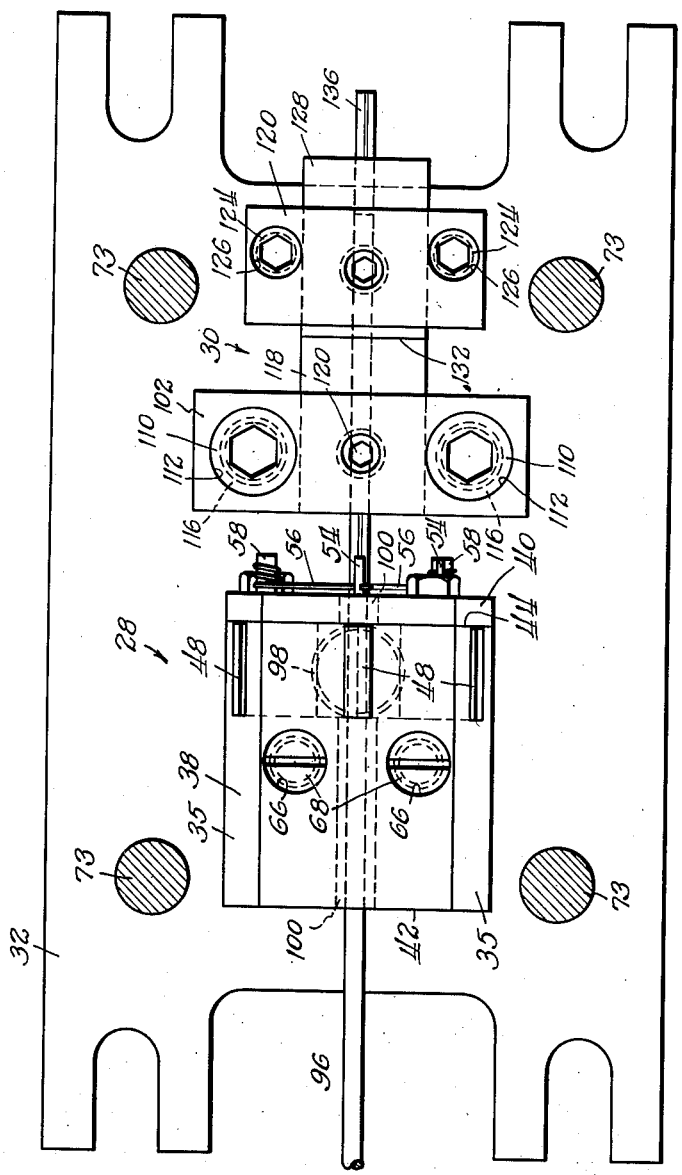
Figure 6 is a view taken on line 6—6 of Figure 5.
Figure 10:
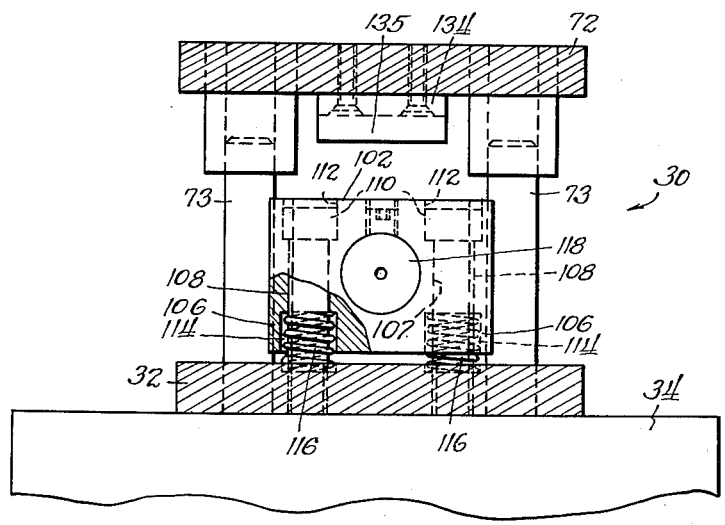
Figure 10 is a view taken on line 10—10 of Figure 5.
Figure 11:
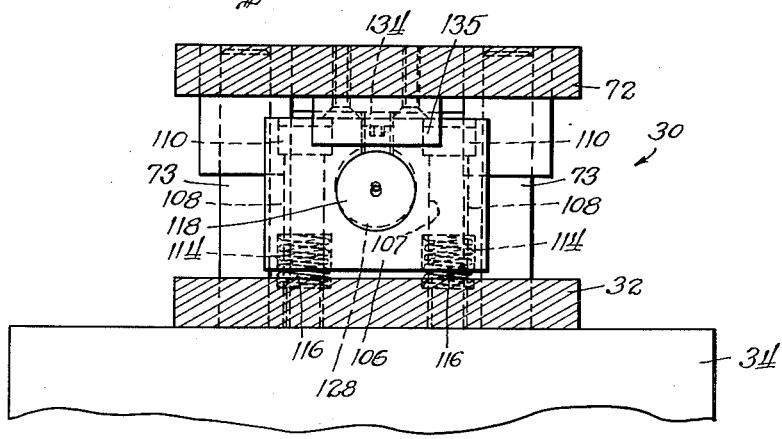
Figure 11 is similar to Figure 10 with the operating parts shown just after the cutting operation.

Referring in detail to the drawings, a standard punch press is shown at 12 to which the apparatus of my invention is applied. The press includes a drive wheel 14 mounted on a shaft 16, the shaft 16 having an eccentric for reciprocating the ram 18. Ram guides 19 are provided for guiding the ram 18 in its reciprocation. Also connected with the shaft 16 is a pitman 20 operated by an eccentric for operating the rod feeding means 22. The press is driven by any convenient power means, and the elements thus far described are standard parts of a punch press. The whole press is shown resting on a base 24, and a container 26 is shown for receiving the finished drive pins.

The main feature of my invention consists in a specially designed die block, or upsetting device, 28, together with other parts specially designed for cooperation with the die block, and which cna be attached to an ordinary press. Associated with the die block and the operating means therefor, is a cutting means 30, both the die block and the cutting means being positioned on a base plate 32, which in turn is secured to a bolster 34 mounted on the base of the press. In addition, the die block 28 and the cutting means 30 are both positioned for actuation by the reciprocation of the ram 18, and finally, both are located for cooperation with the rod feeding means 22.

A preferred form of die block is shown in Figures 7 and 8, where it will be seen that it is of a peculiar polygonal contour. In this form it is shown as a trapezoid, having its bottom and top sides parallel and horizontal, and the two other sides 35 inclined at an angle from the vertical, and in this case the direction of reciprocation of the ram 18. The ram 18 is provided with a ram head 36 which is designed to cooperate with the peculiar shape of the die block 28.

The die block consists of a block proper 38, and a cover plate 40. An axial bore 41 is formed longitudinally through the die block, that is, perpendicular to the trapezoidal section of the block.

For purposes of identification, the end 42 of the die block, next to the rod feeding means 22, will be termed the leading end, and the end 44, the rear end. This orientation will apply to the press as a whole as well. At the rear end of the die block 28 are radial cavities 46 communicating with the axial bore 41 and opening to the exterior of the block at the polygonal surfaces thereof, and also at the rear face of the block proper 38. From Figure 5 it will be seen that these cavities 46 extend only a portion of the longitudinal distance through the block.

Slidable in the cavities 46 are tool bits 48, each having a cutting edge 50 formed on its inner end. It will be noted that the cavities 46 are so disposed that one opens out on each polygonal surface of the die block 28, and accordingly, one tool bit is associated with each polygonal surface. The shapes of the cavities 46 are of a definite formation. The length of the cavities longitudinally of the die block 28 is of a predetermined dimension to provide for maximum length of cutting edges 50 for die forming operation. The width of the cavities is such as to give proper strength to the tool bits.

The cover plate 40 serves to secure the tool bits 48 in the cavities 46. The cover plate 40 is provided with slots 52 disposed radially therein and one registering with each of the cavities 46. Secured to the rear surfaces of the tool bits 48 are lugs 54, which extend into and slide in the slots 52. Springs 56 are anchored on posts 58 on the cover plate 40, and each end of each spring engages one lug 54 for biasing the tool bits 48 outwardly in the die block 28. The cover plate 40 is also formed with a central bore 60 in registration with the axial bore 41 in the die block. The cover plate 40 is secured to the die block by means of bolts or other convenient securing means. When the tool bits 48 are biased outwardly by the springs 56, the outer ends of the tool bits extend outwardly beyond the polygonal surfaces of the die block. The slots 52 limit the outward movement of the tool bits 48. This relationship is shown in Figure 7.

The die block 28 has limited vertical movement, being slidable on pins 62 threaded into the base plate 32, and fitting into openings 64 in the die block. The upper ends of the openings 64 are provided with counterbores 66 for the reception of enlarged heads 68 on the pins 62. The lower ends of the openings 64 are counterbored at 70 for the reception of compression springs 71 biased between the counterbores 70 and the base plate 32. The springs 71 bias the die block 28 upwardly, and the enlarged heads 68 limit the upward movement of the die block.

The ram head 36 includes a supporting plate 72 secured to the lower end of the ram 18 by any preferred means. The plate 72 is formed with holes for sliding on pins 73 which are secured in the base plate 32, for proper alignment and motion of the ram head 36. Secured to the bottom surface of the supporting plate 72 is a block 74 of the approximate length of the die block 28. The rear end of the block 74 is provided with laterally spaced, downwardly depending wedge extensions 75, forming a recess 76 having downwardly diverging surfaces 77. These wedge extensions 75 extend forwardly to a point slightly forward of the front surfaces of the tool bits 48.

Adjustably secured adjacent the inclined surfaces 77 are wear blocks 78, each of which is provided with two horizontally disposed slots 80 through which screws 82 extend and are threaded into the main portion of the block 74. Each wear block 78 has opposite parallel surfaces, these surfaces being also parallel to the respective surfaces 77. Adjusting jam screws 84 are threaded through the wedge extensions 75 and engage the outer surfaces of the wear blocks 78 and are locked in position by nuts 86. Accordingly, the wear blocks 78 are adjustable horizontally by means of the screws 84 which also receive outward thrust of the blocks 78, while the screws 82 serve to support the block in place.

Also secured to the lower surface of the supporting plate 72 is a wear plate 88 positioned in the recess 76 between the wear blocks 78 and which is secured to the supporting plate 72 by means of threaded bolts 90. This wear plate 88 is positioned forwardly of the tool bits 48 and is adapted to engage the upper flat surface of the die block 28.

Rearwardly of the wear plate 80 is a pin 92 threaded into an opening 94 in the supporting plate 72 and adjustable vertically therein. The pin 92 is positioned for engaging the upper tool bit 48 and extends downwardly below the lower surface of the supporting plate 72 for that purpose.

It will be noted that the recess 76 is comparable in contour to the polygonal contour of the die block 28. The rod feeding means 22 is a conventional, intermittently operating, feeding means, and on being actuated by the pitman 20, operates to feed the rod 96 through the axial bore 41 in the die block. In operation, the ram 18 descends on the die block 28 upsetting a segment of the rod 96, and when the ram lifts off the die block, the rod 96 is projected through the die block another distance which is predetermined with respect to the length of the upset area produced on the rod.

Reference may be had to Figures 2, 3, 7 and 8 for the operation of the die block or upsetting apparatus. Figures 2 and 7 show the tool bits 48 in retracted position, that is, away from the rod stock 96. In this position ram 18 is raised off of the die block 28, the die block is held upwardly by the springs 71, and the tool bits 48 are retracted outwardly away from the longitudinal bore 41 by means of the springs 56. Upon the descent of the ram 18, the ram head 36 engages the die block 28 on the top and the wear blocks 78 engage the lateral tool bits 48. The wear plate 88 engages the upper flat surface of the die block 28 ahead of the upper tool bit 48, and forces the die block 28 downwardly toward the base plate 32. At the same time the pin 92 engages the upper tool bit 48, and forces it down in certain relation to the downward movement of the die block 28; and when this action is occurring, the inner surfaces of the wear blocks 78 engage the outer surfaces of the laterally extending tool bits 48. The inner surfaces of the wear blocks 78 being converging upwardly, the lateral tool bits 48 are forced inwardly due to the wedging action of the wear blocks 78. An adjustable stop pin 98 is threaded in the base plate 32, and extends upwardly a slight distance above the upper surface of the base plate 32. When the die block 28 is forcibly lowered as explained above, the lower tool bit 48 comes into contact with the upper end of the adjustable stop pin 98, and is arrested from further movement. When the die block is lowered beyond this point, relative upward movement of the lower tool bit 48 with respect to the die block is effected.

The compression springs 71 have considerable strength in order to effectively raise the die block 28 when the ram 18 is withdrawn therefrom. When the ram head 36 is lowered into engagement with the die block 28, it is not necessary that the die block come into solid engagement with the base plate 32, but must be lowered just enough for the lower tool bit 48 to be actuated toward the center, the remaining tool bits being actuated by the various surfaces of the ram head 36.

The actual movement of the various tool bits 48 may not be exactly simultaneous, but their final force is simultaneous, in producing the upsetting operation. The rod stock 96 is positioned nearly in the center of the bore 41, and for this purpose bushings 100 (see Figure 6) are placed in the front end of the bore 41 and in the hole 60 of the cover plate. Although the upper tool bit 48 does not move downwardly relative to the die block 28 in the same relation as the other tool bits, its ultimate position in upsetting operation occurs, for practical purposes, simultaneously with the other tool bits. The object of the operation is, of course, for all the tool bits 48 to approach their inner positions substantially simultaneously, but relative movement between upper tool bit 48 to the die block 28 is impracticable to accomplish in the same manner as it is with the other tool bits. To surmount this difficulty, the upper tool bit 48 is positioned at such a point that when it is engaged by the pin 92, it will come to its ultimate position immediately. This position is shown in Figure 8, or in a position engaging the rod 96 when the latter is positioned centrally in the axle bore 41. This point is reached before the other three tool bits are positioned at their innermost points. When the die block 28 reaches its lowermost position, the lower and lateral tool bits 48 have been forced inwardly to their final positions, and at this time all four tool bits engage the rod 96 to form grooves in the rod.

It will be noted that while rod 96 is positioned centrally of the bore 41 by the bushings 100, this support is not sufficient to withstand the force produced by any number of the tool bits less than the total. The rod 96 therefore, can be flexed to some extent by the initial action of the upper tool bit 48, but this flexing is neutralized when the full force of all the tool bits is brought into play against the rod. The final force of all the tool bits is accomplished at the same instant, regardless of the fact that one of the tool bits may come to its final location slightly before the others. Therefore, the rod is centered for the upsetting operation by the interaction of the tool bits themselves.

The axial bore 41 is substantially larger than the rod shown in the illustration for the purpose of enabling different sized rods to be used in the apparatus. The bushings 100 may be replaced with different sized bushings to accommodate various sized rods.

In order to adjust the die block 28 itself to accommodate larger rods, two different methods may be used. First, tool bits 48 of lesser radial dimension may be inserted for larger rods, the effect being that they will not be forced in toward the center as far as longer ones; or second, the wear blocks 78 may be adjusted outwardly, the pin 92 adjusted upwardly, and the stop pin 98 adjusted downwardly, enlarging the apparatus in all dimensions, and accordingly, forcing the tool bits 48 inwardly a lesser extent.

The cutting apparatus 30 associated with the upsetting apparatus comprises a movable element 102, and a stationary element 104, both secured to the base plate 32. The movable element 102 includes an outer frame 106 having vertical holes 107 and being positioned on guide pins 108.

The guide pins 108 are threaded in the base plate 32 and have upper enlarged heads 110 which fit into counterbores 112. The lower ends of the holes 107 are counterbored at 114 for receiving compression springs 116 biased between the base plate 32 and the counterbores 114, for biasing the frame 102 upwardly. The enlarged heads 116 limit the upward movement of the element.

Removably fitted in the frame 102 is a cutting quill 118 extending rearwardly from the frame 102 and secured in position therein by a set screw 120.

The stationary element 104 of the cutting apparatus 30 includes an outer frame 120 firmly secured to the base plate 32 by means of threaded pins 122 extending through holes 123 in the frame 120 and threaded into the base plate 32. The upper ends of the pins 122 have enlarged heads 124 fitting into counterbores 126 in the holes 123 for securing the frame 120 in place. A removable quill 128 is inserted in the frame 120 similarly to the quill 118, and is held in place by set screw 130. The forward end of the quill 128 and the rear end of the quill 118 are closely fitted together as indicated by the line 132. These two surfaces form a shearing mechanism for cutting the rod 96 as it passes through the cutting apparatus. This operation may be referred to as cutting or severing, but the action is well known to be shearing.

Immediately above the frame 102 is a wear plate 134 secured to the under-surface of the supporting plate 72, and having a depending guide 135 at the forward edge thereof. When the ram 18 descends and forces the die block downwardly as described above, the wear plate 134 engages the upper surface of the frame 106 and forces the movable element 102 downwardly. The guide 135 engages the front surface of the quill 118 and counteracts any tendency of the quill 118 or its frame to tilt. The quills 118 and 128 have aligned longitudinal axial bores therethrough for the projection of the rod 96 therethrough. On feeding the rod 96 through the upsetting apparatus, or die block 28, it passes through the axial bores in the cutting apparatus 30. The rod then on being positioned in the cutting apparatus 30, is cut by the shearing action of the quills 118 and 128. It will therefore be seen that the cutting action takes place in the same operation as the upsetting operation. When the ram 18 is elevated, the die block 28 and the cutting apparatus 30 return to their normal positions, and the rod feeding apparatus 22 feeds another length of the rod through the machine.

As pointed out hereinbefore, the finished drive pin is to have at least a portion of its length in its original shape, while the area to be upset varies in length for different purposes. Referring to Figure 14, a finished pin is shown at 136 having one end 138 of its original formation, and a portion of the pin having grooves 140 and flutes 142. This type of pin is formed by the die shown in the main modification, a die having four tool bits forming four grooves and flutes. Figure 15 shows how this type of pin is used where a pulley 144 is fitted on a shaft 146, and the pin 136 driven into registering holes in the pulley hub and shaft. The pin is started through the holes by inserting the normal end 138 and driven therethrough. The holes in the hub and in the shaft are of nearly the same diameter as the original diameter of the pin stock, but the flutes 142 extend outwardly from the original dimension of the pin and on driving the pin into the holes, the flutes 142 bite into marginal edge of the holes, securing the pin firmly in place, while the end 138 forms a guiding means for starting the pin thereinto.

As an example of the size of pin as compared with the size of the hole in which it is to be used, consider a pin ¼″ in diameter. The hole in which it is to be used is usually .001 inch or .002 inch larger in diameter than the normal diameter of the pin. The flutes formed by the deforming or upsetting operation extend outwardly from the normal surface of the pin about .008 or .010 of an inch. Then when the pin is driven into the hole, the flutes, being larger than the hole, cut or bite into the marginal surface of the hole. If the material in which the hole is bored is of too hard a metal, the flutes are deformed to some extent and the body of the material forming the flutes is forced into the grooves, but there remains a great amount of friction between the flutes and the marginal edge of the hole.

Figure 16 shows a pin 148 having most of its length 150 of normal dimension and a short portion 152 deformed for securing the pin in place. In this particular use of the pin, a swinging member 154 is pivoted to a forked bracket 156. The portion 152 which has been deformed secures the pin in place, while the swinging member 154 is free to pivot about the smooth portion 150.

In Figure 17 a much larger pin 158 is shown. For this use a deformed portion 160 is formed centrally of the pin, leaving an area 162 at either end of the pin. The pin is then driven through a hole in a shaft 164, so that the deformed portion 160 secures the pin in place in the shaft, and the outer smooth ends 162 form a handle for rotating the shaft 164.

Referring to Figures 2 and 3, it will be noted that the tool bits 48 have a main body portion of rectangular shape, and a tapered cutting edge 58. The main part of the tool bits are of the same cross-sectional shape as the cavities 46 in the die block 28, and in these figures the cutting edges 58 extend the full longitudinal length of the tool bits. The type of tool bit just described is for the purpose of forming the pin as shown in Figure 14. For forming another type of pin, the tool bit of Figure 4 is used. This tool bit has a main shank portion 156 and a cutting edge 168. This tool bit is placed in the die block in the position in which it is shown relative to the position of the corresponding tool bit in Figure 2.

The cutting apparatus 30 is positioned rearwardly of the upsetting apparatus, or die block, 28 in such a position that the shearing edge 132 of the cutting apparatus 30 is positioned a distance which is a multiple of the length of the pin to be formed. In Figures 2 and 3, it is seen that the shearing edge 132 shears the rod stock 96 at the end of the grooves 140, so that the smooth portion in between the two successive upset areas is attached to the trailing edge of the pin being cut off. Therefore, the distance as mentioned above between the shearing edge 132 and the tool bits 48 is measured from the rear surface of the tool bits. When a form of tool bit as shown in Figure 4 is used, that distance is measured to the rear surface of the cutting edge 168, or in other words, the cutting edge 168 is located at such a place on the tool bit 166, that its rear edge is located a predetermined distance from the shearing edge 132. By this arrangement it will then be seen that the cutting apparatus 30 can be in a fixed position longitudinally of the machine and cutting pins from the rod stock 96 at predetermined intervals.

Different forms and different lengths of drive pins can thus be formed in this apparatus by the simple replacement of different types of tool bits as shown in Figure 4, and the main elements of the apparatus may remain fixed.

If preferred, however, the cutting apparatus may be adjustable longitudinally of the machine for cutting off the pins at the proper length.

Figure 12 shows a modified type of die block 170 having a die member 172 fixed on the base of the press and a cooperating die member 174 on the ram head. The die block 170 is hexagonal in contour and each of the cooperating faces of the die members 172 and 174 is made up of three surfaces which are adapted to bear against corresponding tool bits 176, and force them inwardly as in the previous embodiment. In other respects this form is similar or the same as the previous form, the length of the tool bits being such as to penetrate the rod stock 96 an appropriate extent, and the tool bits being biased outwardly by similar springs.

Figure 13 shows a modification of a die block having four sides. In this figure the die block 178 may be square or diamond shaped and is operated by cooperating die members 180 and 182 on the base and ram respectively of the press. In this embodiment the die block 178 is positioned so that all of its faces are at an angle to both the horizontal and the vertical.

Referring again to the original modification, two of the surfaces are horizontal, that is, the top and bottom surfaces. The lateral surfaces however, must be at an angle to the vertical in order that the vertical reciprocation of the ram effects forcing the tool bits 48 inwardly. In this respect the die block shown in Figure 12 comes under the same classification, that is, the top and bottom surfaces are horizontal and the remaining surfaces are at an angle to the vertical. In the form shown in Figure 13, all of the surfaces are at an angle to the vertical.

In all of the forms it will be noted that the outer surfaces of the tool bits and the lateral surfaces of the die blocks are parallel with the surface of the die blocks, and the corresponding surfaces of the die members so that the die members will have sliding engagement therewith and force the tool bits into the die block.

From the foregoing it will be noted that the press for carrying my invention into effect is a standard punch press, and that very little alteration need be made to adapt the apparatus of my invention thereto. The framework, the operating mechanism, the ram, and the rod feeding mechanism are all standard equipment. In this invention, the changes consist in applying a ram head having a special formation, in supplying the upsetting die block, and the cutting means. This device therefore, provides an effective mechanism for forming drive pins at small proportional cost, since the novel mechanism forms but a small part of the whole press.

While I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. A press comprising, a base plate, a die block supported on said base plate for limited vertical movement thereon, yieldable means normally supporting said die block in raised position above said base plate, said die block having a bore through its longitudinal axis, said die block having a plurality of radially disposed cavities therein, tool bits in said cavities and slidable inwardly and outwardly away from the longitudinal axis of the die block, the tool bits having cutting edges on their inner ends, the outer ends of said tool bits extending outwardly beyond the outer surfaces of the die block, a vertically reciprocable ram above said die block, said ram being adapted to force said die block downwardly whereby at least one of the lowermost tool bits engages said base plate and thereby moves inwardly of the die block relative to the movement of the die blocks and said ram having surfaces engageable with other ones of the tool bits and operative for moving them inwardly of the die block.

2. A press comprising, a base plate, a die block supported on said base plate for limited vertical movement thereon, said die block having a bottom surface, upwardly converging surfaces and a top surface, yieldable means normally supporting said die block in raised position above said base plate, said die block having a bore through its longitudinal axis, said die block having a plurality of radially disposed cavities therein, tool bits in said cavities and slidable inwardly and outwardly toward and away from the longitudinal axis of the die block, the tool bits having cutting edges on their inner ends, the outer ends of said tool bits extending outwardly beyond the outer surfaces of the die block, a vertically reciprocable ram above said die block, said ram having surfaces substantially parallel with respective ones of said upwardly converging and top surfaces of said die block, said ram being adapted to force said die block downwardly whereby the lowermost tool bit engages said base plate and thereby moves inwardly of the die block relative to the movement of the die block, said surfaces on said ram being engageable with respective ones of the remaining tool bits and operative for moving them inwardly of the die block.

3. A press comprising, a base plate, a die block supported on said base plate for limited vertical movement thereon, said die block having a bottom surface, upwardly converging surfaces and a top surface, yieldably means normally supporting said die block in raised position above said base plate, said die block having a bore through its longitudinal axis, said die block having a plurality of radially disposed cavities therein, tool bits in said cavities and slidable inwardly and outwardly toward and away from the longitudinal axis of the die block, the tool bits having cutting edges on their inner ends, the outer ends of said tool bits extending outwardly beyond the outer surfaces of the die block, a vertically reciprocable ram above said die block, said ram having a top surface substantially parallel with and engageable with the top surface of the die block in a position thereon laterally removed from the respective tool bit of the die block, vertically adjustable means in the top surface of said ram engageable with the respective tool bit of the die block, vertically adjustable means on said base plate engageable with the respective tool bit of the die block, and wear blocks mounted on said ram and having surfaces substantially parallel with the respective upwardly converging surfaces of the die block engageable with the respective tool bits of the die block, said wear blocks being laterally adjustable toward and from each other.

4. A press comprising, a base plate, a die block supported on said base plate, said die blocks having vertical bores therein, pins in said bores and secured to said base plate, said die block being vertically slidable on said pins, said pins having heads limiting upward movement of said die block, yieldable means normally supporting said die block in raised position above said base plate, said die block having a bore through its longitudinal axis, said die block having a plurality of radially disposed cavities therein, tool bits in said cavities and slidable inwardly and outwardly toward and away from the longitudinal axis of the die block, the tool bits having cutting edges on their inner ends, the outer ends of said tool bits extending outwardly beyond the outer surfaces of the die block, a vertically reciprocable ram above said die block, said ram being adapted to force said die block downwardly whereby at least one of the lowermost tool bits engages said base plate and thereby moves inwardly of the die block relative to the movement of the die block, and said ram having surfaces engageable with other ones of the tool bits and operative for moving them inwardly of the die block.

5. In combination, a base, a die block supported for vertical movement on said base, a plurality of radial tool bits slidably mounted in said die block and slidable to positions wherein their inner ends approach a common meeting point, and actuating means for moving said die block downwardly, certain of said tool bits being exposed to said base and other tool bits being exposed to said actuating means, said actuating means being adapted to move said die block toward said base and to cause engagement by said actuating means and base with the respective tool bits and force them inwardly toward each other.

HOLLIS R. HILSTROM.

REFERENCES CITED

The following references are of record in the file of this patent:

UNITED STATES PATENTS

| Number | Name | Date |
|---|---|---|
| 221,102 | Rowell | Oct. 28, 1879 |
| 449,824 | Pearson | Apr. 7, 1891 |
| 535,446 | Hammesfahr | Mar. 12, 1895 |
| 737,833 | Gardner | Sept. 1, 1903 |
| 840,578 | Morrison | Jan. 8, 1907 |
| 874,448 | Smith | Dec. 24, 1907 |
| 1,181,703 | Warner | May 2, 1916 |
| 1,309,938 | Ellsworth | July 15, 1919 |
| 1,428,219 | Crawford | Sept. 5, 1922 |
| 1,624,925 | Cary | Apr. 19, 1927 |
| 1,773,471 | Berg | Aug. 19, 1930 |
| 1,788,463 | Kappel | Jan. 13, 1931 |
| 1,858,733 | Flachbart | May 17, 1932 |
| 2,014,746 | Robergel | Sept. 17, 1935 |
| 2,030,406 | Schantz | Feb. 11, 1936 |
| 2,144,231 | Schwarz | Jan. 17, 1939 |
| 2,158,434 | Schwartz | May 16, 1939 |
| 2,326,106 | Van Ness et al. | Aug. 3, 1943 |
| 2,371,041 | Flowers | Mar. 6, 1945 |
| 2,376,335 | Braendel et al. | May 22, 1945 |
| 2,376,654 | Braendel et al. | May 22, 1945 |